April 24, 1962     J. BUGOSH     3,031,322

FIBROUS BOEHMITE CONTAINING COMPOSITIONS

Filed Nov. 30, 1959

INVENTOR

JOHN BUGOSH

BY *John W. Klooster*

ATTORNEY

United States Patent Office 3,031,322
Patented Apr. 24, 1962

3,031,322
FIBROUS BOEHMITE CONTAINING COMPOSITIONS
John Bugosh, Wilmington, Del., assignor to E. I. du Pont de Nemours and Company, Wilmington, Del., a corporation of Delaware
Filed Nov. 30, 1959, Ser. No. 856,158
5 Claims. (Cl. 106—286)

This invention relates to new and very useful fluidized mechanical blends containing as essential ingredients a combination of fibrous boehmite and another anisodiametric material, such combination being mixed with a liquid carrier.

These blends have a number of different uses. They are of special value for use in binder compositions of all types. They are also useful in the manufacture of ceramics.

More particularly, this invention is directed to compositions containing a combination of fibrous boehmite and another inorganic, solid, refractory, finely-divided anisodiametric material admixed with a liquid carrier. The combination comprises from about W to 75 weight percent fibrous boehmite and about 25 to (100−W) weight percent of such anisodiametric material where $$W = \frac{78.5 D S_s P_b}{1.00 + 0.785 D S_s P_b}$$

in which formula D is the average diameter in centimeters of the individual fibrous boehmite fibrils, $S_s$ is the average specific surface area in centimeters per gram of such anisodiametric material, and $P_b$ is the average density in grams per cubic centimeter of the fibrous boehmite, the total weight percent of any given combination being 100. The anisodiametric material has minimum average lengths of at least three times that of the fibrous boehmite in any given composition.

The liquid carrier will comprise at least 10% of the composition. The exact proportion of liquid will depend to a considerable extent on the particular use to which it is to be put.

For example, the compositions of the invention are very useful as plastic molding compositions and as adhesives. In such uses a high enough viscosity that the compositions will not flow under their own weight is desired. Therefore, relatively low liquid contents in the range of from 10 to 40% are most useful.

Another useful area of the compositions of the invention are as binders and reinforcing agents for papers, mats, foamed structures, and insulation bats. In such uses it is necessary that the compositions be sufficiently fluid to penetrate within the interstices of such structures. Higher proportions of liquid in the compositions are therefore required. The preferred proportions of liquid are from 50% to 90%.

In a third area of utility of the compositions of the invention, they may be used as flocculating aids in water clarification, as nucleating agents in controlled precipitations, as surface treating, and as dye-mordanting agents for textiles, leather, and other surfaces. In such applications, extremely dilute systems are used. The preferred proportions of liquid for compositions of this type are in excess of 90% and may go to very high proportions, even greater than 99.9%. This latter situation prevails in water clarification and when the compositions of the invention are applied by exhaustion.

The invention is further illustrated by reference to the attached drawings.

Figure 1:
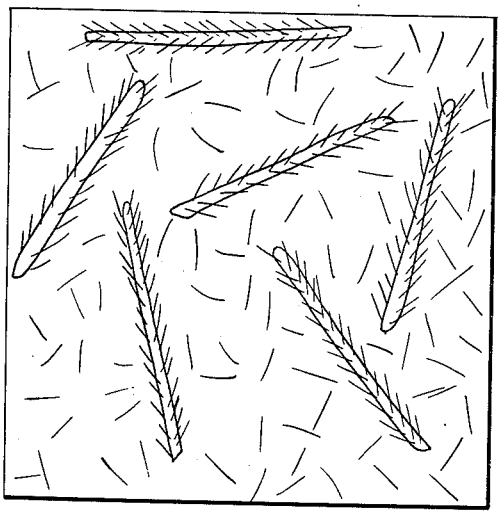
FIGURE 1 is an artist's diagrammatic representation of a composition of the invention in which the anisodiametric, refractory materials have a generally fibrous character.

The invention will now be described in detail.

I. STARTING MATERIALS

(A) Fibrous Boehmite

Solely as a matter of brevity, throughout this application the term "fibrous boehmite" will often be used to refer to fibrous alumina monohydrate having the boehmite crystal lattice.

Fibrous boehmite, itself, is in the form of well-formed and sharply-defined little fibers or fibrils. These fibrils have at least one dimension in the colloidal range and the fibril diameters in a particular product are usually quite uniform.

Fibrous boehmite can be prepared as a colloidal sol by heating an aqueous dispersion of certain aluminas under carefully controlled conditions in the presence of critical amounts of strong monobasic acids. The fibrous boehmite and processes for its preparation are described in detail, for example, in copending application Serial No. 783,602 filed December 29, 1958, now U.S. Patent No. 2,915,475.

Fibrils of fibrous boehmite preferably have an axial ratio of at least about 8:1. It is more specifically preferred that the axial ratio can be from about 20:1 to 150:1. The axial ratio can be as high as 300:1 or even higher. Preferred fibrous boehmite fibrils have an axial ratio which lies between about 60:1 and 80:1. Ordinarily the breadth and thickness of the fibril will be of the same order of magnitude and these dimensions will be less than about 15 millimicrons, but not much less than about 3 millimicrons. It is more specifically preferred that the diameter of fibrous boehmite fibrils be in the range of from about 3 to 10 millimicrons. Still more preferably, it is preferred to use starting fibrous boehmite fibrils in which average particle diameters range from about 4 to 7 millimicrons.

The length of fibrils of fibrous boehmite will generally be indicated from the ratios given above. Preferred fibrils have length on the average from about 50 to 1500 millimicrons. More specifically, it is preferred that the fibrils of fibrous boehmite range from about 50 to 300 millimicrons. More specifically, the preferred fibrils are usually characterized by having lengths of from about 50 to 150 millimicrons, as shown by electron micrograph measurements. In speaking of particle size and shape, it will be understood that reference is made to the average fibril particle; that is, the average width of all such particles in a given sample or quantity of material, or by the same token the average length of all such particles in a given sample or quantity of material.

The fibrous boehmite fibrils used in this invention are further defined by their specific area. Measurement of the specific surface area of the dry fibrous boehmite products provides an accurate and sensitive method for ascertaining the smaller two dimensions of the particles. The specific surface areas of the fibrils can be determined by nitrogen adsorption. In general, the fibrous boehmite fibrils can have specific surface areas ranging from about 100 to 400 square meters per gram ($M.^2/g.$). However, it is preferred to use fibrous boehmite fibers having specific surface areas ranging from about 200 to 400 $m.^2/g$. Most preferred are fibrils having a specific surface area in the range of from about 250 to 350 $m.^2/g$.

Complete descriptions of the various techniques used for physically characterizing fibrous boehmite fibrils are given in, for example, the aforenoted U.S. patent relating to methods for the preparation of fibrous boehmite.

Fibrous boehmite, in addition to being dispersible in water, can be dispersed in organic solvents. A number of such solvents are described in U.S. Patent No. 2,915,475 and these can be used.

While, as has been indicated, the fibrous boehmite used in the products of the invention can be in a dry state initially or in various forms or states of agglomeration, it is preferable for most purposes of the invention to use a fibrous boehmite dispersion in which the individual fibrils are agglomerated as little as possible.

Fibrous boehmite sols prepared according to the teachings of U.S. Patent 2,915,475 may contain in addition to fibrous boehmite an acid radical which is generally associated with an aluminum ion or a basic aluminum ion. "Deionization" as used here refers to the removal of the acid radical, and in general, replacing it with a hydroxyl ion or alternatively removing the acid radical as the free acid, e.g., as HCl or acetic acid.

Strong acid radicals can be removed with an ion exchange resin, according to the teachings of U.S. Patent No. 2,733,205. They can also be removed as a salt by gelling the fibrous boehmite sol with a base and then filtering and washing until the salt of the strong acid radical is practically entirely removed. Preferably, the sol is gelled with concentrated $NH_4OH$ at a pH=10 while at 70 to 90° C., filtered hot and then washed with pH=10 water until anion free and then distilled $H_2O$. This deionized cake which generally contains from 5 to 15 percent $Al_2O_3$ can be reconstituted to an aqueous dispersion by agitating vigorously and if a more fluid dispersion is desired, a weak or strong monobasic acid can be added to lower the pH, e.g., to about 3.0 to 7.0.

Strong or weak acid radicals can also be removed from the aquasols by transferring the undeionized fibrous boehmite sols of U.S. patent application 730,025, abandoned as of January 28, 1959, but refiled December 29, 1958, as the above-mentioned application Serial No. 783,602, to an organic liquid, e.g., butanol followed by azeotropic distillation to remove water and then heating this organosol above the critical point of the organic phase and venting off the organic phase and the acid radical as the free acid. In this way, dry, fluffy, fibrous boehmite can be made which has about 95 to 99 percent less acid radical than present in the aquasol. An especially preferred procedure for removal of weak acids such as acetic acid from fibrous aquasols is to spray dry.

If the final product is to be used as a binder for the manufacture of components to be used in the electrical industry, for example, in products such as molded insulation, inorganic papers, or inorganic capacitors, it is desirable to use fibrous boehmite sols which have a low ion content. This is not essential, however, since the ionic impurities can be removed from the bonded product by thorough washing.

Other Starting Materials

Other materials besides fibrous boehmite used in the processes and products of this invention can generally be classified as follows:
  (A) Refractory, finely-divided, inorganic, anisodiametric, solid materials
  (B) Liquid carriers
  (C) Adjuvants These materials will now be discussed in detail.

(A) Inorganic, solid, refractory, finely-divided, anisodiametric materials, as is explained below, will always be present in the products of this invention. These materials are termed "inorganic" because they contain not more than 50 weight percent of the elements carbon and hydrogen. Preferred materials contain more than 20 weight percent of inorganic elements (i.e., elements other than carbon and hydrogen). Most preferred materials contain substantially no carbon or hydrogen.

These materials are termed "solid" because they maintain their solid state to temperatures up to about 200° C.

These materials are termed "refractory" because they are relatively high melting and possess at least a limited degree of chemical inertness. Thus, these refractory materials exhibit limited solubility characteristics. For example, these materials are soluble to an extent not greater than 0.01 weight percent in water at 20° C. at atmospheric pressure. As observed, these materials are solid up to temperatures of about 200° C. though more preferred refractory materials have melting points in excess of 450° C. Usually such refractory materials tend to fuse at temperatures somewhat below their melting points as those skilled in the art readily appreciate.

By the term "finely-divided" is meant that the materials have a thinnest dimension which is on the average not larger than ten microns. Preferably such thinnest dimension averages not larger than five microns. The greatest dimension of these materials always ranges in average length at least three times that of the particular fibrous boehmite with which it is composited. Thus, these materials will always have an average maximum dimension which is at least three times that of the maximum dimension of the average fibrous boehmite fibrils with which such anisodiametric material is composited. The maximum average length of the material can range very much greater than the fibrous boehmite. This is because such anisodiametric materials of greater length and small crosswise dimension tend to be flexible and so the physical characteristics of the products of this invention are not affected by anisodiametric materials which are vastly greater in length than the fibrous boehmite. Thus, the maximum average length of such anisodiametric materials can range up to an extent of at least about $2 \times 10^5$ times that of the boehmite fibrils or even greater depending upon the particular circumstances involved, as those skilled in the art will appreciate. The smallest dimension of the anisodiametric material is no larger than 10 microns, and its specific surface area is at least 0.1 m.$^2$/g.

By the term "anisodiametric" is meant that these materials have at least two of their dimensions substantially different from the third; that is, at least two dimensions are either much greater or much smaller than the third dimension. Thus, such materials will exhibit ratios of the largest dimension to the smallest dimension of at least 5:1 though often such ratio will be greatly in excess of 100:1.

Such anisodiametric materials can be either natural or synthetic in origin. Chemically these materials will be usually aluminiferous, titaniferous, or siliceous. Very often these materials will be fibrous in character. Natural inorganic starting materials for products of the invention include all naturally occurring mineral fibers, especially asbestos and related siliceous fibers as well as bentonites, especially hectorites.

Synthetic inorganic materials useful in the manufacture of the products of the invention include such items as glass fibers, aluminosilicate fibers, amorphous siliceous fibers, fibers of potassium titanate, mineral fibers made from molten rock such as those commonly called rock wool, asbestos fibers and others. Also included in this general grouping are film-forming or mat-forming plate-like materials such as mica, exfoliated mica, vermiculite, flaked glass or the like. Such plate-like materials can be used either alone or in combinations with fibers. In general, any natural or synthetic inorganic fiber containing compounds of silicon, aluminum or titanium, such compounds being present in a particular fiber either singly or in combination with each other, can be used to make the products of this invention.

Such materials as "Fiberfrax," a fibrous aluminosilicate, "Refrasil," a fibrous pure silica, fibrous potassium titanate, glass fiber produced by spinning molten glass through spinnerettes, "Kaowool," aluminosilicate fiber, can be used to make the products of this invention. Plate-like and fibrous purified clay minerals are also preferred anisodiametric materials of the invention. These include purified bentonites or montmorillonites, attapulgites, kaolinites, purified fibrous and plate-like talcs, and fibrous wollastonite.

As explained, the inorganic, solid, refractory, finely-divided, anisodiametric materials used with fibrous boehmite to produce products of the invention may have lengths ranging from about 3 times that of the fibrous boehmite up to $2 \times 10^5$ times that of the fibrous boehmite.

Actually, when these materials are in the forms of fibers, e.g., their length can range up to several inches in size. Within these limits, the exact dimensions of the anisodiametric materials are not critical. Those skilled in the art will select particular anisodiametric materials for uses in preparing specific products of this invention from a consideration of the properties desired in finished products of the invention. Mixtures of various anisodiametric materials, such as mixtures of fibers and plate-like materials, can be used with fibrous boehmite to make particular products of the invention.

(B) Liquid carriers useful in this invention include water and organic liquids.

In general, any common liquid can be used provided it is inert as respects the components of the products. Liquids usable in the processes and products of this invention include those which are characterized by the fact that they produce in water a pH between 0 and 12 when one gram of liquid is placed in 500 cc. of water and then thoroughly dispersed by shaking or the like. Materials which are more basic than this or more acidic than this tend to destroy fibrous boehmite and so are not preferred for use in preparing products of this invention.

Liquids useful in the invention are also chosen from that class of liquids which is characterized by having a viscosity of less than 500,000 centipoises and vapor pressures of greater than 760 millimeters Hg at 300° C.

Generally, water is a preferred liquid for use in the present invention.

Preferred organic liquids are those which are soluble at least to the extent of 0.1 weight percent in water. Still more preferred organic liquids are those which are completely miscible in water in all proportions at 25° C. at atmospheric pressure.

Fibrous boehmite has the capacity to swell in water, a fact which is of occasional value in producing specific products of the invention.

Organic liquids useful in the invention include ethanol, methanol, dimethyl formamide, ethylene glycol, glycerol, and, in general, alcohols, alcohol-ethers, ethers, liquid hydrocarbons, esters, aldehydes, ketones, mixtures of aqueous and organic liquids, fluorocarbons, and the like.

(C) Adjuvants useful in the invention can be of several different types. In general, these adjuvants are best classified by the effects which they impart to the compositions of the invention. These effects can be classified as follows:

(a) pH control
(b) flocculation
(c) wettability
(d) insolubilization
(e) binding
(f) filling and bulking (a) The most useful materials for pH control are strong to moderately strong acids and bases having monovalent anions and cations, respectively. Useful acids include hydrochloric, nitric, sulfamic, formic, acetic, propionic, mono-, di,- and tri-chloro- or fluoro-acetic acid.

Useful bases include sodium, potassium, ammonium, tetramethyl ammonium, guanadinium, mono-, di-, and tri-methyl, ethyl, or ethanol ammonium and morpholinium hydroxides.

Buffer mixtures comprising mixtures of acids or bases and more or less neutral salts are also of value. In selecting buffer mixtures, it is preferred to use those in which the anions are monovalent if the mixture has an acidic pH and in which the cations are monovalent if the pH is basic.

(b) Flocculating adjuvants are materials which will cause a partial or complete flocculation of solvent dispersions comprising fibrous boehmite and the anisodiametric materials.

Divalent and more highly negatively charged anions are very effective flocculating agents. Organic sulfates, phosphates, sulfonates, and carboxylates containing long hydrocarbon chains are also effective flocculating adjuvants even when the anionic functional group is monovalent. Organic polymers comprising a multiplicity of such functional groups such as organic polyphosphates and polycarboxylates, for example, polymethacrylic acid, are highly efficient flocculating agents. Both naturally occurring and synthetic polypeptides and proteins also function in this manner, particularly when conditions are such that they are on the negatively charged side of their isoelectric points.

These flocculating adjuvants are particularly useful when it is desired to exhaust the fluid blends of this invention onto the surface of other materials such as organic and inorganic fibers, fabrics, felts, foamed materials, rubber lattices, and the like.

(c) To obtain wettability, surface active agents can be used. By the term "surface active agent," it is understood that wetting agents, dispersing agents, suspending agents and emulsifying agents are included.

Suitable surface-active agents are set out, for example, in Searle U.S. Patent 2,426,417, Todd U.S. Patent 2,655,-447, Jones U.S. Patent 2,412,510, or Lenher U.S. Patent 2,139,276. A detailed list of such agents is set forth by J. W. McCutcheon in "Soap and Chemical Specialties," December 1957, January, February, March and April, 1958. See also McCutcheon in "Chemical Industries," November 1947, page 8011 et seq., entitled "Synthetic Detergents"; and Bulletin E–607 of the Bureau of Entomology and Plant Quarantine of the U.S. Department of Agriculture. In general, less than 10 percent by weight of the surface-active agent is present in the compositions of the invention, although usually the amount of surface-active agent in these compositions is less than one percent by weight.

In general, such materials comprise a long hydrocarbon chain and at least one functional group having a pronounced affinity for water. Wetting and surface active agents can be broadly divided into three general types, these being anionic, cationic, and non-ionic.

Cationic surface active agents are ionic compounds wherein the functional group ionizes in such a manner that a positive charge is located on the hydrocarbon chain. Examples are long chain organic amines and quaternary ammonium compounds.

Non-ionic detergents contain non-ionic functional groups such as alcohol, ether, ester, ketone, aldehyde and amide groups. These materials are particularly useful in the compositions of the invention since they are compatible with both positively charged and negatively charged finely divided materials and colloids. Examples of non-ionic wetting and surface active agents are long chain alcohols such as octanol and polyoxyethylene low molecular weight polymers esterified at the terminal hydroxyl groups with long chain fatty acids as well as many other types well known in the art.

Anionic surface active and wetting agents are ionic compounds which ionize in such a fashion that a negative charge is located on the hydrocarbon chain. Various types of long chain hydrocarbon acids and their alkali metal and ammonium salts such as the fatty acid carboxylates, sulfates, sulfonates, phosphates, and phosphonates as well as alkyl-aryl sulfonates are representative of this type of adjuvant.

It will be noted that many of the anionic surface active agents are similar or identical in comparison to some of the flocculating adjuvants. For this reason, this class of compounds is useful primarily when the use requirements of the situation make it desirable to flocculate the fluid blends as well as improve wetting or surface activity.

(d) This type of adjuvant and one of considerable importance comprises water-insolubilizing adjuvants. These are usually compounds comprising polyvalent inorganic anions such as phosphates, sulfates, borates, silicates, chromates, polyphosphates, and the like. If used in large quantities, these materials function as flocculating agents. However, if used in quantities of 5 to 15% on the weight of the fibrous boehmite, it is possible to avoid flocculation and, at the same time, impart a substantial degree of water resistance to any materials bonded with the fluid blends of this invention. The degree of water resistance and wet strength obtained using these adjuvants increases markedly upon drying, and for dried materials it increases rapidly as the drying temperature is raised. At drying temperatures above 150° C. and up to 250° C. extremely water resistant products are formed.

A particularly preferred class of water-insolubilizing adjuvants are compounds of polyvalent inorganic anions, the aluminum salts of which are water insoluble. This preferred class comprises phosphates, borates, and silicates, for example.

The phosphates are especially preferred. Orthophosphates such as phosphoric acid and calcium, magnesium, and aluminum phosphates containing an excess of phosphoric acid such that the phosphate metal compound is solubilized are especially preferred. Products such as "Alkophos C" (a trademark of the Monsanto Chemical Company), which is an acid solubilized aluminum phosphate, are commercially available examples of this type of material.

Another and highly preferred class of water-insolubilizing adjuvants are inorganic colloidal materials having an electrical charge opposite in sign to that of fibrous boehmite, i.e., negatively charged inorganic colloids. Such materials include most of the colloidally dispersed clay minerals such as bentonite and attapulgite. An especially preferred class however is colloidal silica.

It must be noted especially that wet and dry strength of products of the invention tend to be increased by the inclusion of low molecular weight colloidal silica with starting materials.

Generally, such colloidal silica particles do not have diameters in excess of about 10 millimicrons but they can range up to 200 millimicrons or even larger in diameter. The colloidal silica particles can be substantially pure silicon dioxide or alternatively, they can be modified by the presence of other materials chemically bound to or adsorbed upon the surfaces of the particles. The silica particles can be discrete or agglomerated.

Some types of substantially pure silicon dioxide particles can be readily dispersed in both organic and inorganic fluids. Thus, fumed silicas like "Cab-O-Sil," a submicroscopic particulate very pure silica prepared in a hot gaseous environment by the vapor phase hydrolysis of a silicon compound, can be dispersed in a fluent carrier.

Similarly, micronized silica gels can be dispersed in aqueous or non-aqueous fluent carriers. Unmodified, substantially pure silicon dioxide particles can be most readily dispersed in aqueous media.

To promote dispersions of silica particles in organic media, the silicon dioxide particles can be treated with other materials. Thus, the particles can be surface esterified or have chemicals adsorbed upon their surfaces. The silica particles can have adsorbed upon their surfaces a long chain, substituted, quaternary, ammonium ion. The preparation of such silica particles is more particularly described in Iler U.S. Patent No. 2,692,863. Such colloidal particles form true organosols and have average diameters ranging from about 5 to 100 millimicrons.

When surface esterified, discrete silicon dioxide particles are used, the particles are dispersed in organic liquid media as true organosols. These materials are described in R. K. Iler's U.S. Patent No. 2,657,149. See also Iler's U.S. Patent No. 2,801,185.

The preferred silica particles for use in the compositions of this invention containing colloidal silica are those silica particles which form true aquasols. Most preferred silicas are those which form stable aquasols when colloidally dispersed in an aqueous fluent carrier. By the word "stable" is meant that the sols are stable towards gellation or setting for periods of time in excess of one year. A preferred average diameter for the silica particles in such sols is from about 5 to 60 millimicrons.

Particularly advantageous aquasols are those of the Bechtold and Snyder U.S. Patent No. 2,574,902. Ordinarily these sols contain about 30 percent by weight of $SiO_2$ as they are sold in commerce and they can be diluted to whatever extent desired for use in the processes of the invention. The particle size of such sols will ordinarily be about 15 millimicrons in diameter, although sols can be made according to the processes of that patent with particles ranging in diameter up to the limits of colloidal dimension. The $SiO_2:Na_2O$ weight ratio of the sols will range upwardly from 60:1.

Other sols which can be used are those produced by one or more methods shown and described in the following patents: Rule, U.S. Patent No. 2,577,485, Alexander U.S. Patent No. 2,750,345, Bird U.S. Patent No. 2,344,325, Voorhees U.S. Patent No. 2,457,971, Reik U.S. Patent No. 2,428,178, Broughton U.S. Patent No. 2,535,036, White U.S. Patent No. 2,285,477, Marshall U.S. Patent No. 2,356,774, White U.S. Patent No. 2,375,738, Trail U.S. Patent No. 2,572,578, Trail U.S. Patent No. 2,573,743, and Legal, Jr. U.S. Patent No. 2,724,701.

When colloidal silica is used in products of the invention, usually not more than about 50 percent by weight of the boehmite-containing product will be silica. The silica used in products of this invention serves as a water-insolubilizing agent as well as a binder. The amount of colloidal silica used can vary within very wide ranges depending upon the type of particular product desired. The chief value of using colloidal silica in products of this invention is that it serves to cause insolubilization of the alumina component without recourse to a prolonged heating cycle during application of a product of the invention as a binder.

(e) A number of different kinds of binders conventionally used can be composited with the fibrous boehmite and anisodiametric materials to produce products of the invention. Conventional organic binders include organic resins. Examples of organic resins include urea-formaldehyde, phenol-formaldehyde, melamine-formaldehyde resins and the like. Other polymers which are conventionally used as binders include polyvinyl acetate, ethylene/vinyl acetate and vinyl-chloride/vinyl acetate copolymers, polyvinyl alcohol, and other vinyl polymers known to the art.

Inorganic binders similarly can be used with fibrous boehmite. Examples of such inorganic binders include sodium silicate and other glass-forming siliceous materials, low-melting borate glasses and also other well-known inorganic binders especially those used in the binding of inorganic fibers which are subsequently to be used at elevated temperatures.

Examples of miscellaneous types of binders which can be used in products of the invention containing fibrous boehmite include such items as starch, clays, caesin, animal glues and other similar glues, dextrin, synthetic rubbers of butadiene copolymer type such as butadiene/styrene, butadiene/acrylonitrile, butadiene/vinylpyridine copolymers, neoprenes, polyisobutylenes, isobutylene/isoprene (butyl) rubbers and the like, natural rubbers, guar gum, gum arabic, and the like.

(f) Fillers and bulking agents used in products of the invention include the conventional ones such as various clays like china clay, calcium carbonates, titania, barium sulfate, carbon black, graphite, silica, diatomaceous earth, calicium silicates, fine particle size alumina trihydrate such as bayer hydrate, gibbsites, and corundum.

II. PROCESS CONDITIONS

In general, products of the invention can be prepared by conventional means. Thus, one intimately mixes and contacts the fibrous boehmite with the inoragnic, solid, refractory, finely-divided, anisodiametric material. Such mixing or contacting can be accomplished by using dry powder or suitable liquids as an aid to accomplish intermingling of the solid components to form a homogeneous blend. By the term "homogeneous" is meant that in a given blend it is no longer possible to completely separate the individual components into their original pure states by physical methods such as wet or dry screening or gravitational sedimentation.

Any conventional method for mixing or blending can be used. Thus, the components can be milled together in such equipment as ball mills, hammer mills, and the like. They can be mixed in high mixers such as paddle mixers, turbines, colloid mills, and similar equipment. In the event that a particular composition comprises a substantial amount of solvent, relatively mild techniques of mixing starting materials together will suffice to give a satisfactory homogeneous blend of components. Such mild techniques of mixing include manual shaking and low-speed stirring.

Adjuvants can be added at almost any stage of processing depending upon matters of convenience. Thus, when one uses a liquid carrier such as water, water-soluble adjuvants can readily be introduced as solid materials and then blended into the raw materials being processed or the adjuvants can be pre-dissolved and then the resulting solution added to the solid components of the mixtures during processing. When one deals with flocculating adjuvants, it is necessary to introduce these materials at a fairly high rate of dilution in order to avoid localized flocculation or precipitation of the solid components. In general, when one produces a liquid blend the flocculant should not be added to such an extent that solids settle out. Instead, one can add sufficient flocculating agent to thicken a mix up to the point where flocculation begins but not beyond.

In introducing flocculating adjuvants and/or water-insolubilizing adjuvants, it is often desirable to employ high-speed mixing devices such as Waring Blendors, colloid mills, or high-shear mixing equipment. Such equipment insures a homogeneous distribution of adjuvant throughout a given composition.

pH control agents are usually added to a liquid carrier prior to the introduction of the fibrous boehmite or immediately after such fibrous boehmite addition. Such addition of pH control agents is usually done to establish a close control of pH in order to produce liquid products without undesirable flocculation, as is desired in certain use situations. If one adds a pH control agent at the wrong point, one can obtain an undesirable structure in a given product of the invention. This structure could only be changed or reversed at best by careful regulation of the pH to operating levels.

Addition of surface active agents is not critical and can be carried out at any point during processing except when such agents are of the flocculating types. In this instance the consideration above discussed with regard to addition of insolubilizing agents applies.

Addition of pigments will usually take place when one adds the fibrous boehmite because of the capacity of the fibrous boehmite to serve as a suspending agent.

One procedure in preparing compositions of the invention is to micropulverize solids and introduce them as a mass into the liquid carrier. Alternatively, either constituent may be added first, followed by the other with suitable agitation concurrently to achieve a distribution of the first additive throughout the liquid medium or liquid carrier before adding the second.

Finally the two materials may be separately but simultaneously added as solids to the rapidly stirred liquid carrier. In any of these methods agitation must be continued until a homogeneous mixture is obtained or homogeneous blend is obtained.

Generally speaking blending is carried out at room temperatures though one may in certain instances desire to use elevated or subnormal compared with room temperatures in order to, for example, hasten the solubilization of certain of the adjuvants.

For example, one would normally use cold solutions to solubilize polyvinyl alcohol whereas one would use hot solutions to solubilize gelatin. High-shear equipment will be used in some instances preferentially over low-shear equipment as those skilled in the art of preparing fluid mixtures will appreciate. Such equipment will be used when it is desired to produce the compositions of the invention in the most highly dispersed condition. On the other hand, in applications such as thickening, for example, it will be desired to use low-shear mixing equipment in order to avoid decreasing the desired viscosity of the compositions or excessive degradation of the anisodiametric materials.

In preparing blends of the invention, a preferred procedure is first to blend the dry components together into a completely homogeneous mix. Sometimes such resulting dry blends can be used without any addition of liquid carried. This is true especially in the manufacture of ceramics and various sintered products.

However, it will usually be found preferable to add at least a small quantity of liquid carrier to such resulting dry mixtures. Such addition of liquid carrier can be accomplished in a separate and subsequent operation. Of course, the amount of liquid added can vary greatly. Thus, the compositions of the invention find use in a very dilute or very concentrated form as respects the quantity of liquid carrier present.

III. PRODUCT DESCRIPTION

In general, products of this invention are fluidized mechanical blends containing fibrous boehmite and at least one refractory, finely-divided, solid, inorganic, anisodiametric material as essential ingredients. Preferably, such blends will contain at least a minor proportion of a liquid carrier.

As optional ingredients, these blends can additionally contain the various adjuvants earlier described.

The term "fluidized" has reference to the capability these blends have of flowing without strongly resisting forces capable of changing shape (but not volume). That is all are capable of flowing upon application of a moderate force, and will adopt any desired physical shape or form in response to the operation of this force. Actually, the blends have many characteristics of fluids or viscous syrupy physical characteristics. Some compositions of the invention contain so little liquid that they actually could be termed free-flowing powders, but because of their capability to flow are considered to be fluidized in the sense explained.

The fluidized character of the blends of the invention can be demonstrated by the use of a Carver press. Such a press is fitted with a cylinder having an inside diameter of one inch and an orifice at its bottom equal to one-half inch in diameter. Such a cylinder is fitted with a piston and so designed as to fit between the platens of a Carver press with the cylinder aperture so arranged as to permit the extrusion to occur.

When a composition of the invention is placed in such an apparatus and extruded under a pressure of about 5,000 lbs. per square inch, it is sufficiently fluid to be extruded. A pressure of about 1,000 lbs. per square inch will normally be sufficient for extrusion. The essential character of the extruded blend is not changed by such extrusion.

The term "mechanical" is used to signify that the components of the blends of this invention are joined by forces which are primarily physical in nature. However, it is to be understood that chemical forces of a type which do not lead to a rigid structure are not to be excluded by the term "mechanical"; and, in fact, they likely exist in the blends of the invention.

The term "blends," which is used as a descriptive term for the compositions or products of the invention, is used in its generally accepted sense to signify a mixture in which there are completely uniform properties, these being of such a character that the blend displays at least some properties not associated with the individual components, though the individual components can be characterized even in the blend. Thus, the blends are distinguished from simple mixtures wherein the components simply are mingled together with each component retaining its individual properties. Blends are also distinguished from chemical compounds wherein interaction between components has occurred to an extent of such that the original identities of the components have been lost.

It is an outstanding advantage of the combinations of the present invention that the essential starting materials, i.e., the fibrous boehmite and anisodiametric material, when composited together in accordance with the invention, produce products having properties not associated with either of these individual components. Thus, combinations of these components prepared in accordance with the invention have superior properties not associated with the individual components when they are employed separately in equivalent amounts for the same end use. In fact, the combinations of the invention could actually be termed synergistic (see discussion below).

While preferred blends of the invention are in the form of liquids and paste, useful products can be prepared in the form of free-flowing solids. Frequently, there is no sharp line of distinction between solids, pastes, and liquids so that such a classification must be used simply as a matter of convenience. In general, these variations of the physical state of the product blends depend upon the relative amounts of liquid present in a given blend.

Figure 2:
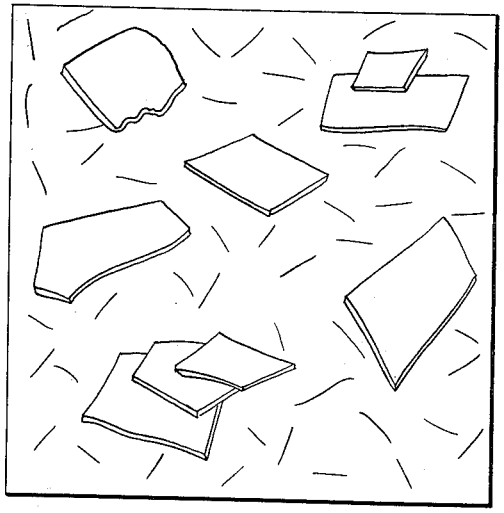
FIGURE 2 is an artist's diagrammatic representation of a composition of the invention in which the anisodiametric, refractory materials have a generally plate-like character.

The nature of the blends of the present invention is better understood by reference to the attached drawings. FIGURES 1 and 2 are an artist's pictorial schematic representations of the blends of the invention.

In FIGURE 1, the dark, long cylinders or fibers are the anisodiametric, refractory particles used in making the blends of the invention, while the much smaller hairlike fibrils represent the fibrous boehmite. Each of the particles of the anisodiametric materials is coated with a monolayer of fibrous boehmite. The interparticle spaces between the anisodiametric particles comprise a continuous phase of free monohydrate particles which are not associated with the anisodiametric particles.

FIGURE 2 shows a similar representation of the blends of the invention. Here the large, plate-like particles represent the anisodiametric, refractory particles. As in FIGURE 1, the smaller hairlike fibrils represent the fibrous boehmite. Here, the fibrous boehmite is only associated to a limited extent with the anisodiametric material. Note that the compositions of the invention need not have any close association between the fibrous boehmite and the other anisodiametric material, so long as the composition is homogeneous. This situation arises when both types of particles have a similar electrical charge, e.g., and thus repel or fail to attract one another.

Except for variations in relative size or in shape within the limitations discussed herein, FIGURES 1 and 2 show the extreme limits within which the blends of the invention exist. It is to be understood that intermediate cases of partial association occur and that the interparticle area between the particles of the refractory, anisodiametric materials may comprise only the fibrous alumina monohydrate particles. They may also comprise these in association with various additives and adjuvants such as solvents.

In general, blends of the invention always contain boehmite in a continuous phase, i.e., that phase of a system which tends to fill in the interstices between the anisodiametric materials. Whether or not there is boehmite in a continuous phase can be readily determined by those skilled in the art. One method of determining the presence of boehmite in a continuous phase in a particular blend of the invention is to stir such blend vigorously in a large excess of water. The quantity of blend used is such that the solid concentration is less than one percent by weight. The resulting mix can then be subjected to one of two treatments.

One treatment employs direct visual examination. By this procedure, the mix is further diluted with water to a point where it contains not more than 0.01 weight percent solids. Then, the resulting mix is applied to an electron microscope screen by conventional spray technique so as to deposit an extremely thin layer of such mix on this screen. The screen is then examined on the electron micrograph and one observes whether the fibrous boehmite is entirely associated with the surface of the anisodiametric material or whether it is "free" fibrous boehmite, i.e., not all of the fibrous boehmite is attached to the anisodiametric particle so that at least some of it is in the continuous phase.

The second method is to quantitatively determine the amount of fibrous boehmite present which is not physically or chemically bound to the anisodiametric particles. The procedure here is to first dilute the aqueous mix down to the point where it contains not more than 0.1 weight percent solids. Next, such dilute mix is spun in a centrifuge at about 1700 revolutions per minute at a pH of 4. The centrifuge should have a side radius of about one foot and the time of centrifuging should be about one hour in duration. Under such centrifuging conditions the anisodiametric particles and fibrous boehmite associated with the surfaces will be found at the bottom of the centrifuge at the end of this operation, while any fibrous boehmite in the continuous phase remains in the supernatant liquid. The presence of fibrous boehmite in the liquid can be observed by an electron microscope, and the quantity of fibrous boehmite in the liquid can be determined by chemical analysis.

In relation to the amount of anisodiametric material used, the minimum amount W of fibrous boehmite present in terms of weight percent will always be such as to signify the formula:

$$W = \frac{78.5 D S_s P_b}{1.00 + 0.785 D S_s P_b}$$

in which formula, D is the average diameter in centimeters of individual fibrous boehmite fibrils, $S_s$ is the average specific surface area in centimeters per gram of anisodiametric material, and $P_b$ is the average density in grams per cubic centimeters of fibrous boehmite.

The maximum weight percent of fibrous boehmite which can be present in combination with anisodiametric material will usually be about 75 weight percent. Note that the term weight percent as used in the context refers to the combined weight of fibrous boehmite and anisodiametric material. As explained, compositions of the invention preferably will contain other materials in the nature of either liquid carriers or adjuvants. Thus, the combinations of the invention may contain a very small percentage of combined weight of fibrous boehmite and anisodiametric material.

Actually, when a blend of the invention is sold commercially, it will be in the form of a concentrate and will contain a high percentage of combined weight of fibrous boehmite and anisodiametric material. However, in a use situation, for example, in certain treatments of textile fibers, compositions of the invention may contain not more than 0.001 combined weight percent of fibrous boehmite and anisodiametric material. However, it must be remembered that the relationship between the quantity of fibrous boehmite and the quantity of anisodiametric material will remain in the proportions as described above.

Note that 75 weight percent of fibrous boehmite corresponds approximately to an equivalent weight of 52.5 weight percent $Al_2O_3$ since the amount of anhydrous alumina as $Al_2O_3$ in fibrous boehmite is usually about 70 percent.

As explained, blends of the invention will always contain at least a small percentage of a liquid carrier, say at least 5 percent. Usually this amount will be in excess of 10 percent. The maximum amount of liquid that can be present in a given blend can range to very high values, say in excess of 99.99 percent.

Thus, compositions of the invention contain, on a combined weight basis, at least 0.001 weight percent of a mixture of fibrous boehmite and anisodiametric material and the balance up to 100 percent by a liquid carrier. Such small quantities of fibrous boehmite and anisodiametric material have great utility on certain substrates. Mixtures of fibrous boehmite and anisodiametric material exhaust substantively upon substrates even from very dilute dispersions. Since the quantity of fibrous boehmite and anisodiametric material deposited upon a substrate depends upon the quantity of the mixture in a dispersion, such dilute dispersions of these mixtures provide an almost ideal means for depositing very small amounts of the mixture upon substrates. In general, however, a more usual lower limit of combined weight of fibrous boehmite and anisodiametric material in dispersions of the invention will involve at least about 0.1 weight percent solids in a fluid dispersion. Preferred blends of the invention will obviously contain a higher percentage of boehmite and anisodiametric material since commercially these blends will usually be sold as concentrates which can be diluted by a liquid carrier by the user or used directly as the concentrate by the user.

The importance of pH control in the blends of the invention lies in the fact that the blends vary widely in the degree of dispersion present depending upon the charge on the fibrous boehmite particle surface. This charge on boehmite particle surfaces is in turn affected by a number of factors, such as the nature of the particular liquid carrier used, the amount and valence of soluble salts present, and most especially, by the concentration of hydrogen or hydroxyl ions, as measured by pH. The available evidence strongly indicates that these ions are strongly absorbed on the boehmite fibril surface and largely determine the state or degree of electrical charge on the fibrous boehmite surface.

Since the extent to which the fibrous boehmite particles are present as discrete, ultimate fibrils, as opposed to more or less complex aggregates comprising several or many fibrils in association, is governed by the degree of the electrical charge; and since this is in turn controlled to a considerable extent by the hydrogen or hydroxyl ion content of which the pH is a quantitative measure, it is clear that, by control of the pH of a liquid dispersion, it is possible to control the state of aggregation of the fibrous boehmite fibrils.

For example, if it is desired to obtain the greatest possible degree of dispersion, this is accomplished by adjusting the pH in the range of about 4 to 2. As the boehmite surface is amphoteric, the minimum state of charge is attained in the pH range of 6 to 9. At higher pH values, boehmite becomes negatively charged.

Thus, if it is desired to mix boehmite with other materials which are positively charged, such as with colloidal zirconia, or vanadium pentoxide for example, the systems will be compatible and flocculation avoided by adjusting the pH of the mixture within the acid range, for example, between 2 and 5.

If it is desired to avoid flocculation when mixing with negatively charged materials such as silica or glass fibers, the pH of a boehmite dispersion can be adjusted to the basic side as for example above 9.

Flocculation of the boehmite upon going through the region of minimum charge of 5 to 8 can be minimized by adding small amounts of a reagent which will form stable complex ions with aluminum ions which are usually present to at least a small extent in fibrous boehmite dispersions. Tartaric, citric, or ethylenediamine tetracetic acids are examples of such complexing agents. It is believed that these materials prevent the formation of insoluble $Al(OH)_3$ within this pH range, and thus avoid the formation of permanently water-insoluble aggregates.

If high thickening qualities are desired, or if it is desired to form very viscous compositions of the invention, it is often possible to induce a partial, but not complete, flocculation. As will be noted hereafter, this can be done by adding a flocculating adjuvant of one of the various types which has been described. This may also be accomplished or assisted, however, by control of the pH as above described. For this purpose the pH can be adjusted within the range of 5.0 to 9.0.

IV. PRODUCT USES

In general, products of the invention have outstanding advantages not possessed by any of the components of the blends and not possessed by any prior art products. Thus, the synergistic blends of the invention can be used to prepare ceramics having high-strength characteristics. Also the blends have superior film-forming characteristics, can be in a highly dispersed state, and can be highly chemically reactive.

Blends of the invention have many uses; for example, they can be used as binders, adhesives, molding compositions, cements, cold welding agents, glues, and, in general, in any application where a strong refractory bond is needed to unite two or more materials together. These blends can also be used as base materials for preparing inorganic, refractory films, papers, felted products, foamed insulation, molded products, and the like, using processing conditions similar to those now known to those skilled in the art.

Compared with fibrous boehmite itself, or the anisodiametric materials separately employed, products such as films, mats, molded objects and the like which are bonded with the blends of the invention have higher strength, better flexibility, better impact strength, and better chip, crack and peel resistance.

Because of their high chemical reactivity, fluidity, and binding capacity, they are excellent reinforcing agents for foam rubber, polyurethane foams, non-woven fabrics, etc.

Because of their refractory primarily inorganic nature, they are exceptional bonding agents for all types of insulation as well as for making formed bodies by slip-casting. Thus, materials such as boron nitride, silicon carbide, carbon, molybdenum disilicide, magnesium oxide, refractory pure aluminas of various types such as alpha- and gamma-alumina, amorphous silica, quartz powders, stabilized zirconia, and the like, have a unique combination of high green strength at low temperatures coupled with extremely refractory characteristics at high temperatures when bonded with the fluid blends of this invention.

As compared to materials bonded with fibrous boehmite alone, the fluid blends of the invention show equal and usually higher levels of strength coupled with greater flexibility, toughness and impact resistance. Bodies bonded with the formulations of the invention comprising silica sols, or metal phosphates, or both, as water-insolubilizing agents also show greatly improved water resistance, dimensional stability, and wet strength when exposed to humid or aqueous environments than do those bonded with fibrous boehmite alone.

The fluid blends of the invention are excellent bonding media and bases of all kinds of inorganic, refractory paints, enamels, and adhesives. In such applications they show greatly improved flex, crack and chip resistance compared to similar paints, enamels or adhesives bonded with fibrous boehmite alone.

Paste blends of the invention have outstanding fluidity characteristics and are especially suited for pressing and sintering them at elevated temperatures. For such purposes, the blends of the invention can contain very small quantities of liquid carrier. Indeed, some of the products of the invention are almost dry powder and not even paste because of the small amount of liquid present.

In fluid products of the invention, the degree of fluidity associated with the blends compared to the total quantity of solids present can be made to be much greater than would be expected from the properties of the constituents considered separately. This requires proper control of the pH and other factors as previously discussed. Apparently the fibrous boehmite in combination with the anisodiametric material enables one to produce a fluid composition containing a very high percentage of solids.

When blends of the invention are used to produce solid articles, it seems that the bonding characteristics of fibrous boehmite complement the reinforcing characteristics of the anisodiametric materials with the result that one obtains superior products compared with those known to the prior art. For example, shrinking between the bonds by the solid bodies is minimized, and the occurrence of microscopic cracks is avoided.

One of the interesting properties possessed by the compositions of this invention is that of a very wide ranging and controllable degree of swelling. By swelling it is meant the property of a system to incorporate large volumes of a liquid without separation into two phases. The extent of swelling in the compositions of the invention can be controlled in three ways, which are: (1) by control of the polarity of the solvent, (2) by control of pH, and (3) by control of the type and amounts of soluble salts present in the system.

In particular, low polarity solvents or solvent mixtures, pH values in the range of 6 to 9, and high concentrations of soluble salts, particularly of those having polyvalent anions such as sulfates or phosphates; as well as various combinations of these factors, favor maintenance of the fibrous boehmite in an unswollen condition.

High polarity solvent mixtures such as those comprising water, dimethyl formamide, or the low molecular weight alcohols, particularly the polyfunctional alcohols such as ethylene glycol and glycerol, favor swelling and even complete dispersion to highly fluid mixtures. This is also true of pH values in the range of from 2 to 5 and for systems which contain small amounts of soluble salts.

Thus by adjustment of one or more or of some combination of the above factors, it is possible to form compositions of the invention which initially are very fluid even though the solids content is very high and then by a suitable change in conditions such as the addition of a more polar solvent or a change in pH to cause a tremendous increase in viscosity to take place. This property is not possessed by anything like a comparable degree by either the fibrous boehmite or the anisodiametric material when present separately.

This application is a continuation-in-part of my copending application Serial No. 763,428, issued December 15, 1959, as U.S. Patent 2,917,426, which is a continuation-in-part of my application Serial No. 357,629, now abandoned.

This invention is further illustrated by the following illustrative examples:

EXAMPLE I 0.5 part by weight of No. 2 grade chrysotile asbestos was dispersed with 0.002 mole $AlCl_3$ per gram of asbestos, 0.4 part by weight of $Al_2O_3$ as a fibrous boehmite sol was then added. The fibrous boehmite sol was prepared as shown in my copending application Serial No. 783 602, now U.S. Patent No. 2,915,475. Briefly, a basic aluminum chloride solution containing an Al:Cl ratio of 6:3 is made up from aluminum metal and aluminum chloride. This solution is diluted to about 2% alumina and then heated for four hours at 160° C. This sol contains fibrous boehmite alumina particles having a specific surface area of about 290 m.$^2$/g. The sol produced contains about 16% of unpolymerized alumina essentially as $AlCl_3$ and has a pH of 3.02. The fibers in the sol have a diameter of about t5 millimicrons and lengths of about 1 micron.

The overall concentration of the fluid blend of asbestos and fibrous boehmits was 1%. The sol was completely stable for periods in excess of a week although the starting asbestos dispersion settled overnight.

This blend was used as a binder for glass fiber paper, for fibrous potassium titanite insulation, and for binding aluminum silicate refractory fibers into a synthetic paper.

In each case, similar bonded products were made using the dispersed asbestos alone as a binder and the fibrous boehmite alone as a binder. In all cases the product bound with the fluid blend was clearly superior in strength to those bound with either the dispersed asbestos alone or with the fibrous boehmite alone.

EXAMPLE II

A fibrous boehmite sol is prepared by stirring 10% by weight of a redispersible fibrous boehmite powder into distilled water. The boehmite powder is made by spray drying a sol according to the method of copending application, Serial No. 730,026, now abandoned. The original sol which is spray dried is obtained by the process of copending application, Serial No. 619,794. The dispersible boehmite powder analyzed 69.93% $Al_2O_3$ and has 10.31% acetate radical (expressed as acetic acid) remaining in the product. The powder has a specific surface area of 293 m.$^2$/g., and the fibers are roughly 225 millimicrons in length.

The above dispersion was diluted with water to give a 5.7% dispersion.

A 4% dispersion of asbestos is prepared by dispersing 80 grams of Canadian chrysotile asbestos in 3920 grams of water. Dispersion is accomplished using an "Eppenbach Homomixer" run at top speed for an hour. This is a laboratory type colloid mill having turbine blades turning at about 8,000 r.p.m.

The above two dispersions are mixed in the various proportions listed below by putting the required amount of each dispersion in a Waring Blendor and mixing for five minutes. The resulting fluid blends are deaerated in a filter flask using a vacuum, cast as thin liquid films on chromium plated "ferrotype" photographer's plates and dried for 2 to 3 hours at 62° C. in an air circulating oven. They are then baked for one hour at 250° C. The resulting films are stripped from the casting plates and their tensile strength determined. The results obtained are tabulated below:

| Composition | | Tensile Strength of Cast Sheet in p.s.i. |
|---|---|---|
| Percent Asbestos | Percent Fibrous Boehmite | |
| 100 | 0 | 162 |
| 73.6 | 26.4 | 1,160 |
| 62 | 38 | 1,880 |
| 51.3 | 48.7 | 2,480 |
| 41.2 | 58.8 | 3,200 |
| 31.8 | 68.2 | 4,000 |
| 23 | 77 | 2,900 |
| 18.8 | 81.2 | 520 |

It will be noted that all the fluid blends of the invention make films which are from 3 to 25 times as strong as those made with pure asbestos. It is also obvious from the trend of strength with composition that the blends of the invention are at least this same factor stronger than films of pure boehmite.

Exactly the same procedure is used to make a film from a 50–50 mixture of 3R12 grade Canadian chrysotile asbestos and a dispersion of a commercially available spherical colloidal alumina powder having a particle size of 20 millimicrons. This composition has only ⅕ the strength of the same composition when using fibrous boehmite as the alumina source.

EXAMPLE III 600 grams of the dry, dispersible fibrous boehmite powder described in Example II is mixed with 400 grams of Canadian 6–D grade chrysotile asbestos. This mixture is dry blended in a cone blendor and then micronized in an air micronizer. The resulting dry powder is free flowing and fluid and could be cold pressed and sintered to form strong, dense bodies.

When suspended in water this dry powder is dispersed to give a stable fluid dispersion which does not settle out on storage. This dispersion is an excellent binding agent for rockwool insulation and forms very strong bats.

In contrast, micronized asbestos containing no fibrous boehmite forms a viscous flocculent mass when suspended in water. This suspension is not stable and the asbestos tends to separate by sedimentation if the dispersion is allowed to stand. This suspension is almost worthless as a binder for rockwool insulation, giving bats which are not appreciably stronger than unbonded controls.

EXAMPLE IV

The procedure used in Example III is employed to prepare dry fluid blends of fibrous boehmite and the following clay minerals:

Kaolin
Talc
Fibrous wollastonite
Attapulgite
Hectorite
Bentonite

5% aqueous dispersions of these fluid blends are prepared by dilution with water and stirring. It is found that all of these aqueous fluid blends remain suspended very much more satisfactorily than did 5% dispersions of the clay minerals alone. These blends are cast as thin films on glass plates, air dried, and baked at 250° C. The resulting films are hard, adherent, and show good water resistance. Films cast from the pure clay minerals are relatively soft, weak, and powdery and have little or no water resistance.

When 6% "Alkophos C" (acidic aluminum phosphate solution) is added to each of the dispersions, excellent water resistance can be obtained in the case of the fluid blends by baking the films at temperatures as low as 150° C. "Calgon" (an inorganic polyphosphate), or phosphoric acid could be used instead of the "Alkophos C" and give substantially equivalent results.

EXAMPLE V 0.5 part by weight of "Vitron 106" borosilicate glass fibers are mixed in a cone blendor with 0.5 part by weight of fibrous boehmite powder of the type used in Example 2. Ten percent water on the weight of the solids is then added. The resulting fluid blend is cold pressed in a Carver press at a pressure of 10 tons per square inch, and sintered for 4 hours at 650° C. The resulting dense body is strong, relatively tough and very refractory showing no signs of softening or melting even at 1000° C.

A similar pressing of the glass fibers alone results in a much poorer green compact which showed evidence of extensive breaking and cracking of the glass fibers to a powder. This material after sintering is much less refractory than that made from the fluid blend and softened at temperatures well below 800° C.

EXAMPLE VI

A heavy paste of fibrous boehmite, 0.4 part by weight, fibrous potassium titanate, 0.7 part by weight, and water, 3.3 parts by weight is prepared by dry mixing the potassium titanate and the fibrous boehmite and then adding the water and mixing in a ribbon blendor. This is used to form an insulating coating around an $Al_2O_3$ tube which is used as the tube in a high temperature silicon carbide sintering furnace. After drying the paste and firing by heating the tube in place in the furnace assembly, it is found that the paste is converted into a light, but strong insulating layer.

A similar experiment using a pure boehmite paste gives a much more dense insulation after firing which showed signs of some cracking. It is not as good an insulating coating as that prepared from the fluid blend. No bonded coating at all resulted from an attempt to use the same procedure to form an insulating coating of fibrous potassium titanate in the absence of boehmite by the same procedure.

EXAMPLE VII 50 parts by weight of a purified kaolin clay having an average thickness in the range of 0.1 to 1 micron and average lengths and widths of 5 to 50 microns are mixed with 25 parts by weight of the dry dispersible fibrous boehmite powder described in Example 2. 25 parts, by weight of water and 10 parts by weight of 85% phosphoric acid are added and the resulting heavy paste mixed in a ribbon blendor. This viscous but still fluid composition of the invention is extruded through a ½ inch orifice from a one inch diameter cylindrical die by pressing in a Carver laboratory press at a pressure less than 5000 p.s.i. The mixture extruded readily to form a rod which is converted to a strong dense ceramic by drying and then firing for six hours at 1000° C.

EXAMPLE VIII

A mixture whose composition is identical to that of Example VII except that the water is omitted is added to 850 parts by weight of kerosene. The resulting relatively thin dispersion is forced into a leaky portion of a basement wall. A 50–50 emulsion of water in a continuous phase of kerosene is then pumped into the hole to displace the original kerosene phase. As the kerosene continuous phase containing dispersed water contacted the fibrous boehmite-kaolin-phosphoric acid blend, the blend began to swell and formed a water impervious tight plug. Upon drying, the hole appears to be completely closed and no longer would admit water into the basement.

EXAMPLE IX

A blend of the invention is prepared comprising 60 parts by weight of fibrous boehmite, 40 parts by weight of 6–D Canadian chrysotile asbestos and 1900 parts by weight of water. This is mixed on a colloid mill until a thin homogeneous colloid dispersion resulted. This is added to 500 parts by weight of a dispersion of 0.1 micron borosilicate glass fibers suspended in 10,000 parts by weight of water. After adjusting the pH to 3.0 with a small amount of nitric acid, a solution containing 20 parts by weight of a commercial flocculating agent is added. This material is made by the Calgon Company, Inc. and sold under the trade name "Calgon." It is thought to be a mixture of sodium polyphosphates, principally sodium hexametaphosphate.

This material causes a partial flocculation of the asbestos fibrous boehmite onto the glass fibers. The mixture is filtered through a paper makers screen.

Upon drying the resulting inorganic paper, it is found to be unusually strong and to exhibit an exceptional level of wet strength. It is heated for two hours at 260° C. and still retains substantially all its dry and wet strength. The tensile strength of this paper is about 700 p.s.i.

I claim:

1. A composition consisting essentially of about 0.01 to 99.5 weight percent of a combination of fibrous boehmite and an inorganic, solid, refractory, finely-divided anisodiametric material and from about 10 to 99.99 weight percent of a liquid carrier, said carrier being a liquid having a vapor pressure greater than 760 milliliters of Hg at 300° C., having a viscosity less than 500,000 centipoises, and a water-solubility of at least 0.1 weight percent and being selected from the group consisting of water and organic liquids which when dispersed in water at the rate of 1 g./500 cc. produce a mixture having a pH between 0 and 12, said combination of fibrous boehmite and anisodiametric material being composed of from about W to 75 weight percent fibrous boehmite having a surface area of about from 100 to 400 m²/g., and about 25 to (100−W) weight percent of anisodiametric material, based upon the total weight of the combination, where $$W = \frac{78.5 D S_s P_b}{1.00 + 0.785 D S_s P_b}$$

in which formula D is the average diameter in centimeters of the individual fibrous boehmite fibrils, $S_s$ is the average specific surface area in centimeters per gram of such anisodiametric material, and $P_b$ is the average density in grams per cubic centimeter of the fibrous boehmite, said anisodiametric material being characterized by having minimum average lengths of at least three times that of the fibrous boehmite and a surface area of at least 0.1 m²/g.

2. A composition of claim 1 in which the anisodiametric material is selected from the group consisting of glass fibers, aluminosilicate fibers, amorphous siliceous fibers, potassium titanate fibers, rock wool, and asbestos fibers.

3. A composition of claim 2 into which there has been incorporated from 5 to 15% by weight, based on the weight of fibrous boehmite, of a water-insolubilizing adjuvant which is a compound having a polyvalent inorganic anion.

4. A composition of claim 3 wherein the water-insolubilizing adjuvant is a compound, the aluminum salts of which are water-insoluble.

5. A composition of claim 3 wherein the water-insolubilizing adjuvant is a negatively charged inorganic colloid.

References Cited in the file of this patent
UNITED STATES PATENTS

| | | |
|---|---|---|
| 1,962,577 | Wolochow | June 12, 1934 |
| 2,267,913 | Halstead | Dec. 30, 1941 |
| 2,592,521 | Thompson | Apr. 8, 1952 |
| 2,661,288 | Barbaras | Dec. 1, 1953 |